United States Patent

Obendiek

(10) Patent No.: US 6,604,775 B2
(45) Date of Patent: Aug. 12, 2003

(54) TOP FOR A CONVERTIBLE VEHICLE

(75) Inventor: Klaus Obendiek, Passau (DE)

(73) Assignee: Edscha Cabrio-Dachsysteme GmbH, Hengersberg (DE)

( * ) Notice: Subject to any disclaimer, the term of this patent is extended or adjusted under 35 U.S.C. 154(b) by 0 days.

(21) Appl. No.: 10/116,498

(22) Filed: Apr. 3, 2002

(65) Prior Publication Data

US 2002/0171258 A1 Nov. 21, 2002

(51) Int. Cl.⁷ .................................................. B60J 7/00
(52) U.S. Cl. ................................... 296/108; 296/107.08
(58) Field of Search ......................... 296/108, 107.07, 296/107.08, 107.09, 223, 195, 116, 224, 146.14

(56) References Cited

U.S. PATENT DOCUMENTS

| | | | | |
|---|---|---|---|---|
| 4,573,732 A | * | 3/1986 | Muscat | 296/108 |
| 4,634,171 A | * | 1/1987 | McKeag | 296/108 |
| 5,654,615 A | * | 8/1997 | Brodsky | 296/107.08 |
| 5,746,470 A | * | 5/1998 | Seel et al. | 296/108 |
| 5,769,483 A | * | 6/1998 | Danzl et al. | 296/108 |
| 5,823,606 A | * | 10/1998 | Schenk et al. | 296/107.08 |
| 6,010,178 A | * | 1/2000 | Hahn et al. | 296/107.08 |
| 6,019,416 A | * | 2/2000 | Beierl | 296/107.08 |
| 6,039,383 A | * | 3/2000 | Jambor et al. | 296/108 |
| 6,062,628 A | * | 5/2000 | Guillez | 296/108 |
| 6,131,988 A | * | 10/2000 | Queveau et al. | 296/108 |
| 6,186,577 B1 | * | 2/2001 | Guckel et al. | 296/107.08 |
| 6,293,605 B2 | * | 9/2001 | Neubrand | 296/108 |
| 6,299,234 B1 | * | 10/2001 | Seel et al. | 296/108 |
| 6,315,349 B1 | * | 11/2001 | Kinnanen | 296/108 |
| 6,382,703 B1 | * | 5/2002 | Queveau et al. | 296/108 |
| 6,419,296 B2 | * | 7/2002 | Dintner et al. | 296/108 |
| 2002/0093218 A1 | * | 7/2002 | Weissmueller et al. | 296/107.08 |

FOREIGN PATENT DOCUMENTS

| | | |
|---|---|---|
| DE | 19706444 | 6/1998 |
| DE | 29800159 | 6/1999 |
| EP | 0857598 | 8/1998 |

* cited by examiner

*Primary Examiner*—Kiran Patel
(74) *Attorney, Agent, or Firm*—Davidson, Davidson & Kappel, LLC

(57) ABSTRACT

A top for a convertible vehicle, comprising a roof part, said roof part at least partially covering the vehicle in a closed state and being pivotable about a main bearing; a frame element, said frame element being arranged in a rear area of the vehicle; a rear element, said rear element at least partially covering said rear area of the vehicle in a closed state, and a loading lid; said rear element being fixed on said frame element, in such a way as to be pivotable relative to said frame element, by means of a rear bearing arranged at a distance from said main bearing; said frame element being fixed on the vehicle in such a way as to be pivotable relative to the vehicle about an axis arranged in the region of said main bearing; said roof part being pivotable relative to the vehicle about said axis together with the frame element in an open, deposited position of said roof part; said main bearing being firmly connected to said frame element, and said loading lid being fixed on the rear element in such a way as to be pivotable relative to the rear element.

15 Claims, 10 Drawing Sheets

TOP FOR A CONVERTIBLE VEHICLE

The invention relates to a top for a convertible vehicle, comprising a roof part, said roof part at least partially covering the vehicle in a closed state and being pivotable about a main bearing, a frame element, said frame element being arranged in a rear area of the vehicle, a rear element, said rear element at least partially covering said rear area of the vehicle in a closed state, and a loading lid, said rear element being fixed on said frame element, in such a way as to be pivotable relative to said frame element, by means of a rear bearing arranged at a distance from said main bearing, said frame element being fixed on the vehicle in such a way as to be pivotable relative to the vehicle about an axis arranged in the region of said main bearing.

DESCRIPTION OF THE PRIOR ART

In the construction of modern convertibles, increasing use is being made of more complex convertible tops, which are constructed, in particular, as multi-part hard-shell folding tops. Since such folding tops are used not only on sports vehicles but also for saloons, there are higher requirements with regard to keeping a sufficient luggage-space volume available, even in the open state of the top, and to sufficient flexibility when loading the luggage-space volume.

DE 197 06 444 C1 describes a hard top for a convertible, which has a front roof part and a rear roof part with a fixed rear window, it being possible for the rear window to be slid under the front roof part by a linear drive before a process in which the top is lowered, and it being possible for the roof parts, which are deposited in an open state of the top, to be moved simultaneously as the luggage-space lid is opened, by means of a rotationally fixed connection to the luggage-space lid. The disadvantages here are, on the one hand, that the movement of the rigid rear window by means of a linear drive can only be achieved technically in a very complex manner, with a separate drive generally being necessary to move the rear window in addition to the drive for the top. Owing to the fact that, depending on the state of the top, the luggage-space lid can be moved either together with the top or relative to the top, a complex mechanism is necessary for the optional coupling of the pivoting axes of the top and the luggage-space lid. Moreover, the openable luggage-space lid must be matched to the size of the deposited top. In the case of relatively large folding tops, in particular three- or multi-part folding tops, this has the effect that a significant proportion of the body in the rear area of the vehicle has to be pivoted together with the deposited top in order to fully free the loading volume, part of which is under the top.

EP 0 857 598 A1 describes an arrangement for covering a luggage space of a convertible, a first element being connected to a second element in such a way that it can be pivoted up counter to the direction of travel, and the second element being connected to the body of the vehicle in such a way that it can be pivoted up in the direction of travel. A convertible top that can be deposited in the luggage space of the vehicle when the first element is pivoted up cannot be connected to one of the elements in this case, with the result that it is not possible to pivot the deposited top up in the direction of travel together with the second element.

SUMMARY OF THE INVENTION

It is the object of the invention to provide a top for a convertible vehicle which allows access to a luggage-space area of the vehicle in a versatile way and in a way that is matched to the respective state of opening of the convertible top.

According to the invention, this object is achieved by a top for a convertible vehicle, comprising a roof part, said roof part at least partially covering the vehicle in a closed state and being pivotable about a main bearing; a frame element, said frame element being arranged in a rear area of the vehicle; a rear element, said rear element at least partially covering said rear area of the vehicle in a closed state, and a loading lid; said rear element being fixed on said frame element, in such a way as to be pivotable relative to said frame element, by means of a rear bearing arranged at a distance from said main bearing; said frame element being fixed on the vehicle in such a way as to be pivotable relative to the vehicle about an axis arranged in the region of said main bearing; said roof part being pivotable relative to the vehicle about said axis together with the frame element in an open, deposited position of said roof part; said main bearing being firmly connected to said frame element, and said loading lid being fixed on the rear element in such a way as to be pivotable relative to the rear element.

According to the invention, the loading lid, which is similar in configuration to a conventional luggage-space lid, is fixed pivotably on the rear element, the rear element, for its part, being fixed pivotably on a frame element. In this arrangement, the pivoting of the rear element relative to the frame element takes place during the opening process of the convertible top. The frame element is mounted pivotably on the body of the vehicle, it being possible for the frame element to be pivoted up together with the rear element and the loading lid plus the folded-up convertible top in order to allow optimum access to the remaining luggage-space volume when the convertible top is open. On the other hand, the loading volume remains fully accessible when the top is closed, as in the case of a conventional luggage space in saloons. As an alternative, it is possible to access the loading volume by means of the loading lid when the top is open, even if the free loading diagonal is limited by the deposited top.

The loading lid is preferably fixed on the rear element by means of a four-bar linkage and is supported relative to the rear element by means of a gas spring in order, on the one hand, to allow the luggage-space lid to be fitted in the rear area of the vehicle with a minimum of gaps, and, on the other hand, to ensure particularly convenient actuation of the luggage-space lid by means of the gas spring.

It is particularly advantageous if the rear element is fixed on the frame element by means of a four-bar linkage, thus allowing a sequence of motion of the rear element which allows optimum and joint-free fitting of the rear element into the remainder of the vehicle body in the closed state. During an opening process of the rear element, the sequence of motion made possible by a four-bar linkage, corresponding to the superimposition of a rotary motion and a translatory motion, provides a simple means of avoiding collision with non-moving parts of the vehicle body.

In a preferred embodiment of the invention, the main bearing is fixed on the frame element in the vicinity of the axis of the frame element, the said axis being fixed relative to the body, with the result that, as the frame element is pivoted up, the roof part, which is deposited in the open state, is pivoted together with the frame element without the need for a complex mechanism for coupling the axes of the top and the frame element.

In a preferred refinement of the invention, the roof part comprises a rigid rear window, which is pivoted with respect to the roof part in the open, deposited position of the roof part, the pivoted rear window thus making available a particularly large useable luggage-space volume. It is advantageously possible here for a further roof segment to be provided, which is likewise pivoted out of the area of the roof part in the open, deposited position, with the result that the roof part now has a U-shaped opening, the two legs of the U corresponding to the C pillars of the vehicle, a free through-loading space being created in the folded-over deposited position of the roof part by virtue of the fact that the U-shaped roof part is deposited with the opening of the U pointing downwards and rearwards.

It is particularly advantageous if a central roof part and a front roof part are provided in addition to the roof part, the roof part, the central roof part and the front roof part being connected to one another by means of a linkage, which forms a positive control means, a three-part hard-shell folding top thereby being formed overall. To control this three-part hard-shell folding top, main links connected pivotally to the main bearing at a distance apart can then be provided, and these, for their part, can be driven by means of a driving device comprising a hydraulic cylinder and a link mechanism. Overall, this provides a convertible top with three shell elements, a pivotable rear window and a roof segment, which, on the one hand, is suitable for covering even the passenger compartments of large saloons and, on the other hand, can be deposited in the rear area of a vehicle in a space-saving manner, there being optimum access to the luggage-space volume both in the open and the closed state of the top.

Further advantages and features of a top for a convertible vehicle according to the invention will become apparent from the exemplary embodiment described below and from the dependent claims.

The invention is explained in greater detail below with reference to a preferred exemplary embodiment of the invention and using the attached drawings.

DETAILED DESCRIPTION OF A PREFERRED EMBODIMENT

Figure 1:
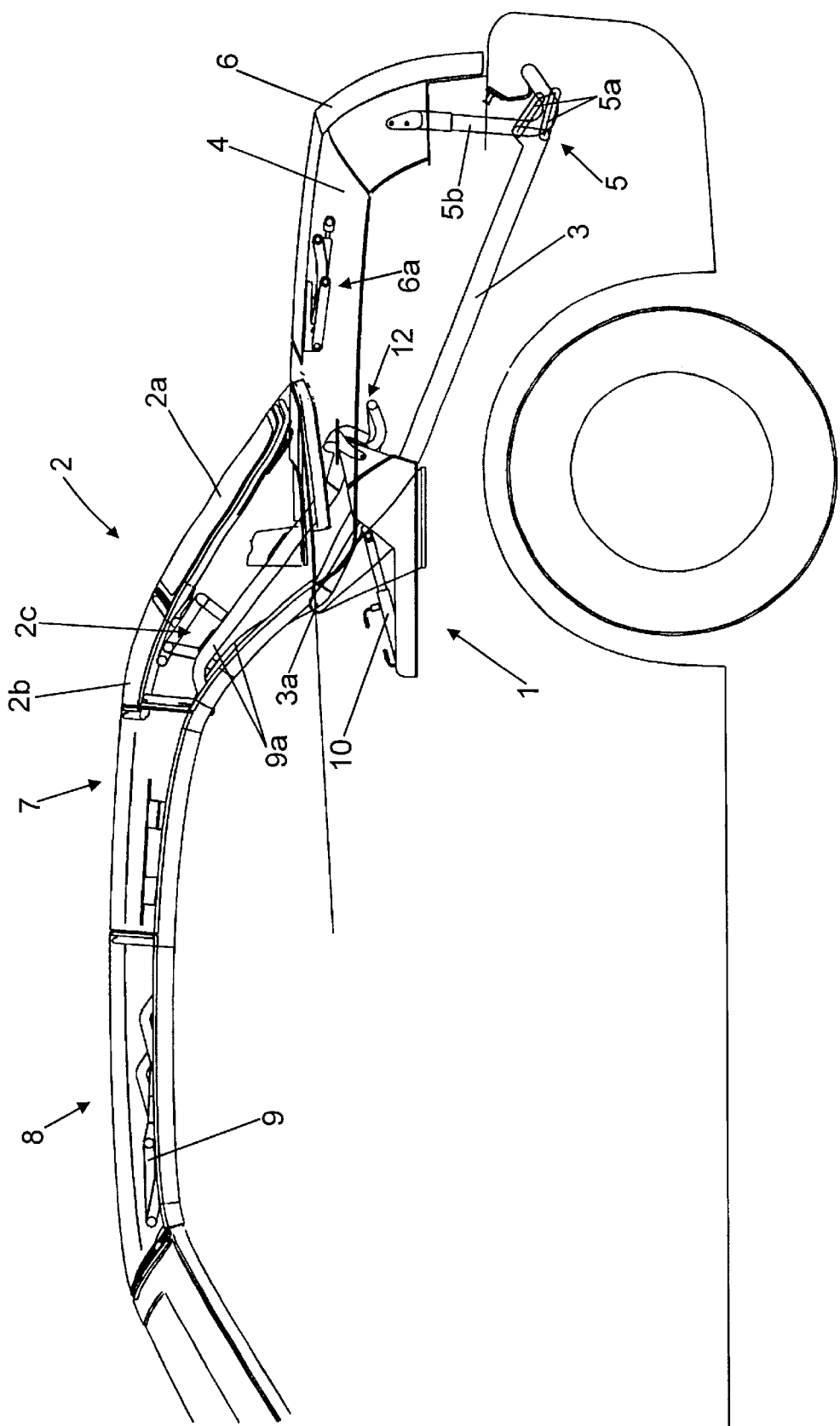
FIG. 1 shows a schematic view of a top for a convertible vehicle according to the invention in the closed state.

As shown in FIG. 1, a top according to the invention comprises a roof part 2 with a rigid rear window 2a fixed pivotably on the latter and a further roof segment 2b, which can be pivoted out, a central roof part 7 and a front roof part 8, all the roof parts being connected to one another in a positively controlled manner by means of a linkage 9. In particular, the linkage 9 comprises two main links 9a, which are pivotally connected to a main bearing 1 at a distance apart and can be driven by means of a driving device 12 comprising a hydraulic cylinder 10 and a link mechanism 11. The two main links 9a are connected to the roof segment 2b and the rigid rear window 2a by a four-bar rear-window linkage 2c. The roof part 2 is firmly connected to one of the main links 9a.

The main bearing 1 is firmly connected to a frame element 3, on which a rear element 4 is furthermore pivotably fixed by means of a rear bearing 5.

In this case, the frame element 3 can be pivoted relative to the vehicle about a axis 3a fixed to the body. Opening of the frame element 3 corresponds to pivoting in the direction of travel.

The rear element 4 can be pivoted relative to the frame element 3 by means of the rear bearing 5, the rear bearing 5 being formed, in particular, by a four-bar linkage which comprises a portion of the frame element 3, two rear-joint links 5a and a cranked rear-bearing bow 5b firmly connected to the rear element 4. Opening the rear element 4 corresponds to pivoting counter to the direction of travel.

The rear element 4 forms parts of the externally visible vehicle body in the rear area of the vehicle.

A loading lid 6 is fixed pivotably on the rear element 4 by means of a four-bar linkage 6a, a gas spring 6b additionally being supported on the loading lid 6, on the one hand, and on the rear element 4, on the other hand, for the purpose of ergonomic actuation of the loading lid. Opening the loading lid 6 corresponds to pivoting the loading lid 6 in the direction of travel.

Figure 2:
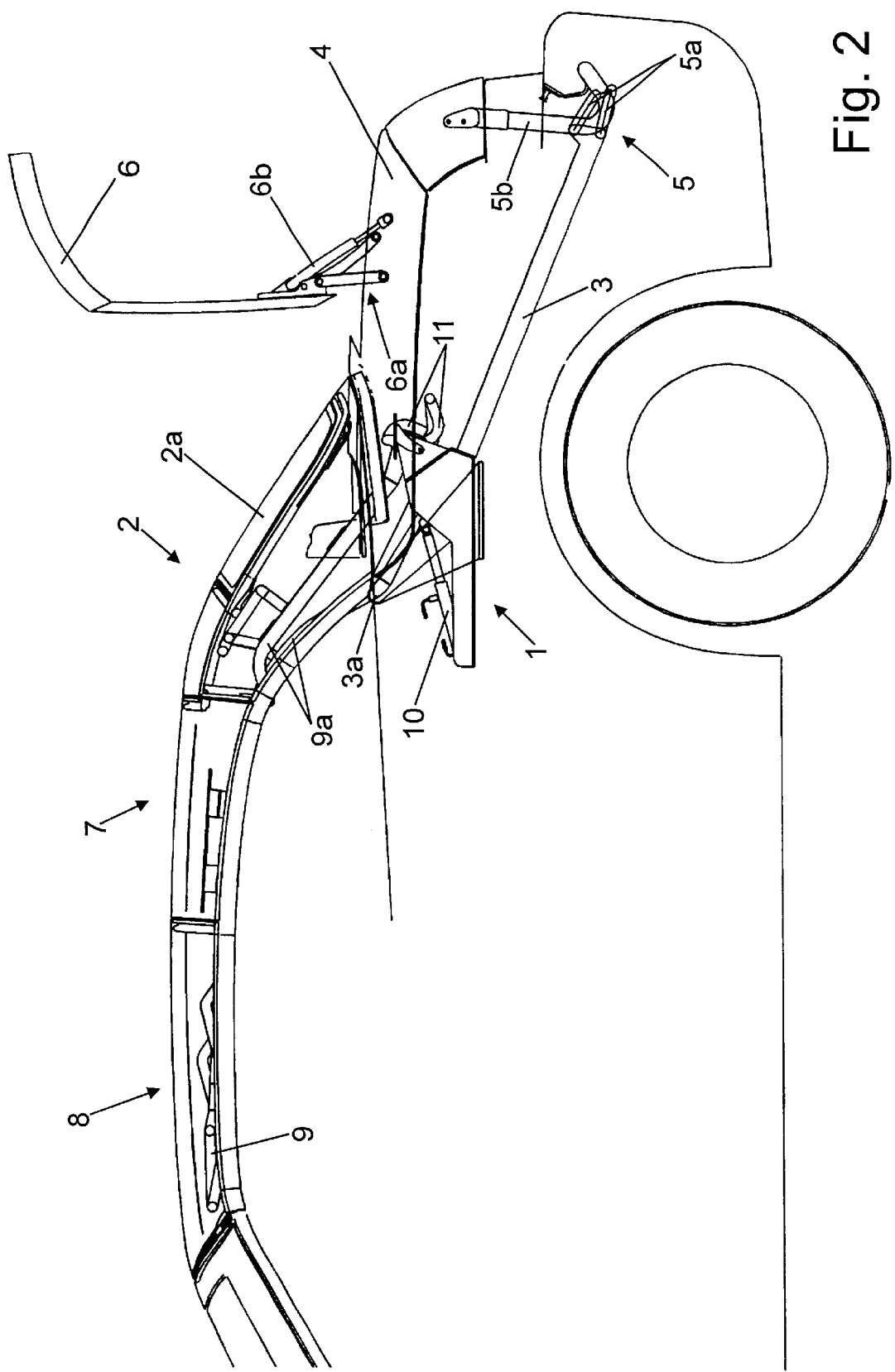
FIG. 2 shows a top for a convertible vehicle in accordance with FIG. 1 in the closed state with the loading lid open.
Figure 8:
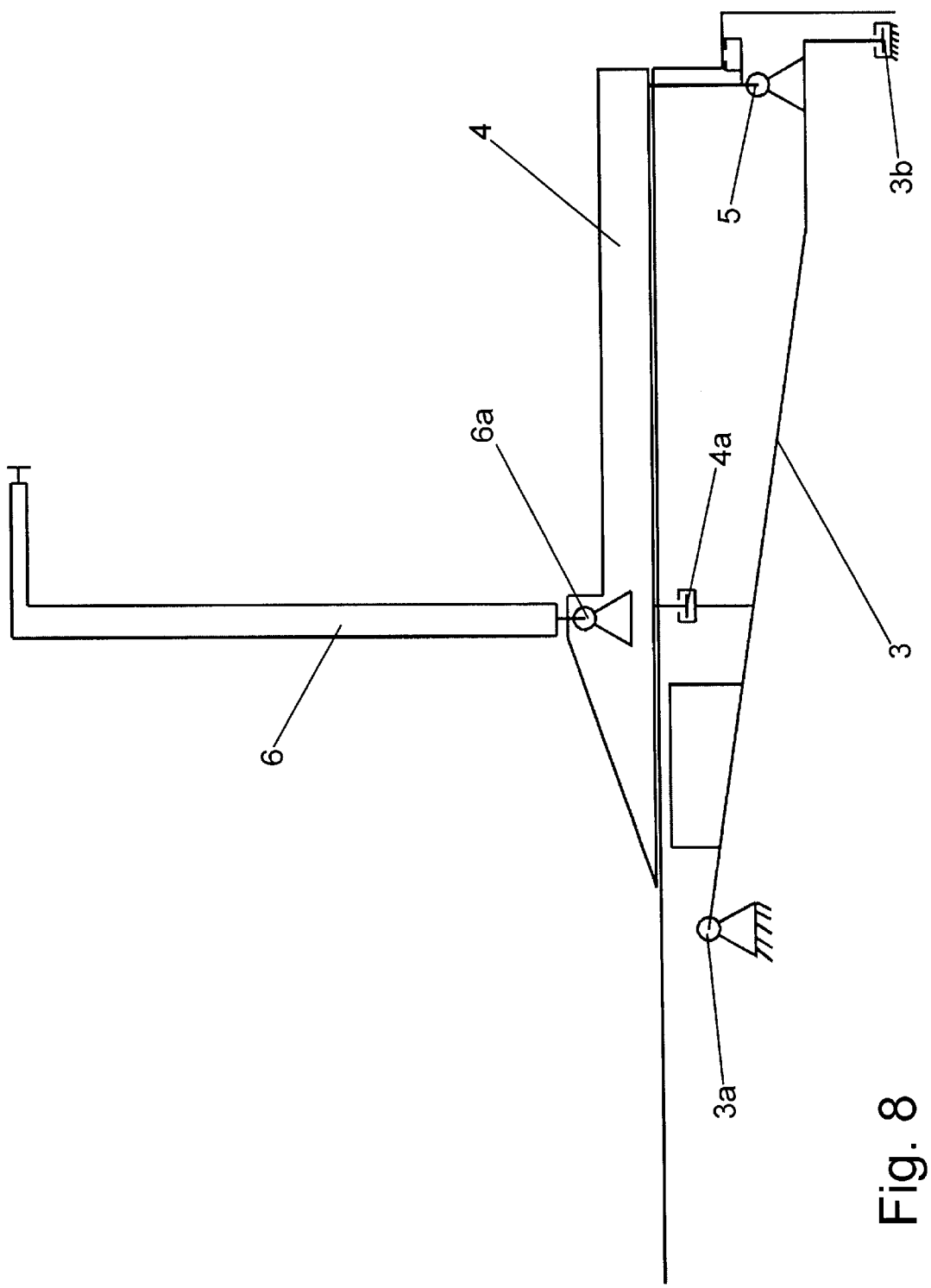
FIG. 8 shows a schematic diagram in accordance with FIG. 7 with the loading lid open.
Figure 9:
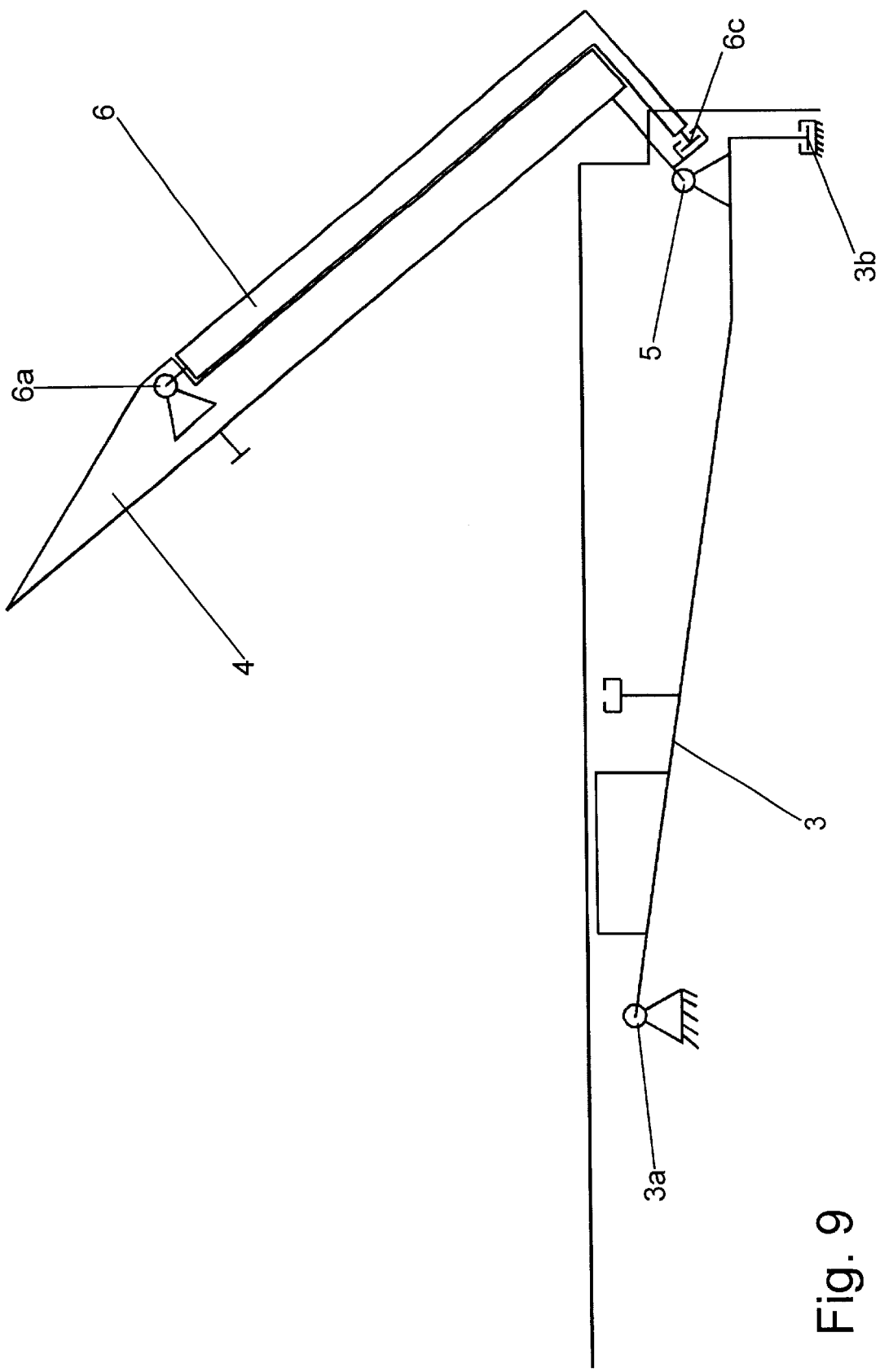
FIG. 9 shows a schematic diagram in accordance with FIG. 7 with the rear element open.
Figure 10:
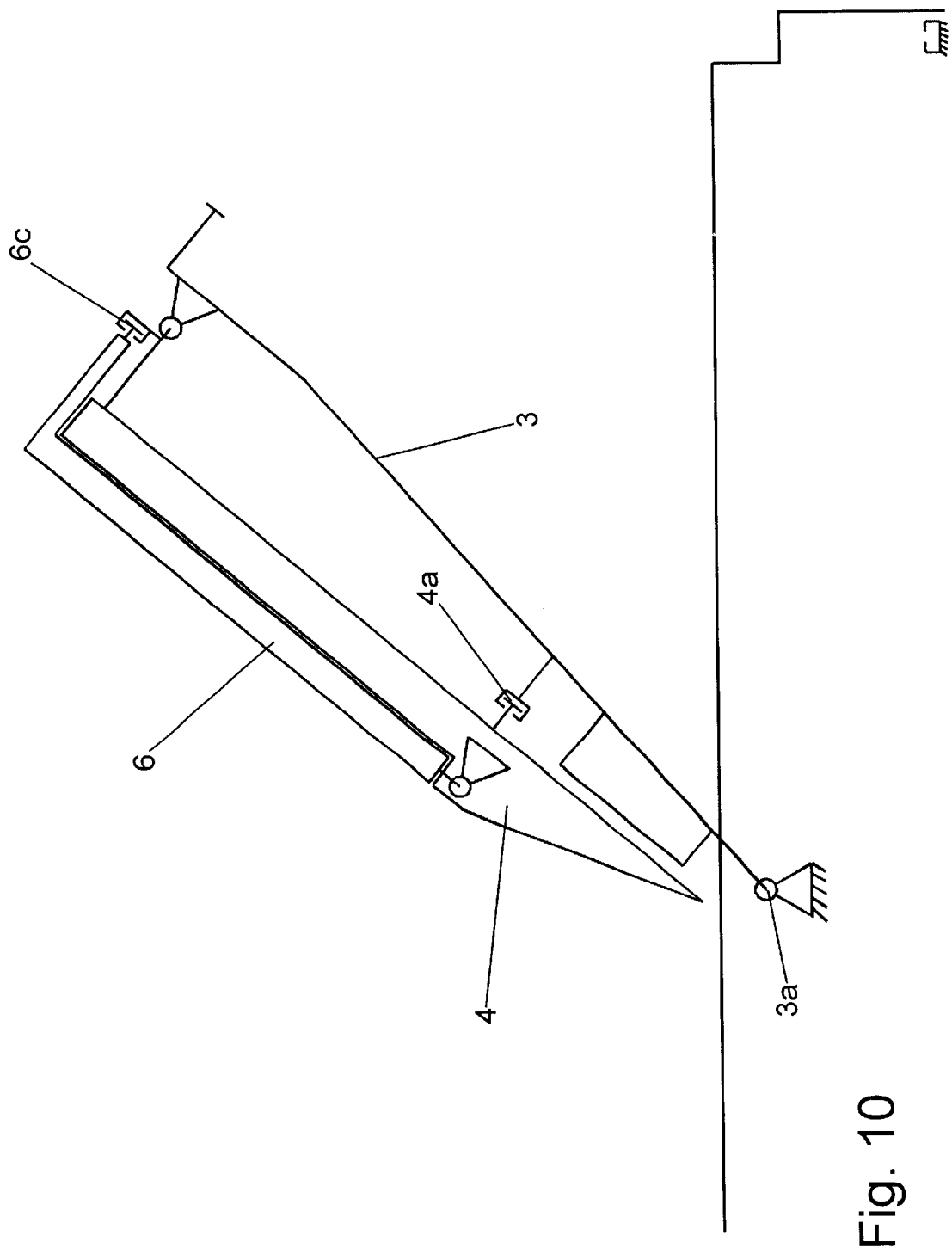
FIG. 10 shows a schematic diagram in accordance with FIG. 7 with the frame element pivoted up.

The invention operates as follows:

In a closed state of the top and of the luggage-space covers in accordance with FIG. 1, the maximum possible luggage-space volume is available for loading purposes. For access to this luggage-space volume, the loading lid 6 can be opened in the manner of a conventional luggage-space lid (see FIG. 2 and FIG. 8).

Figure 3:
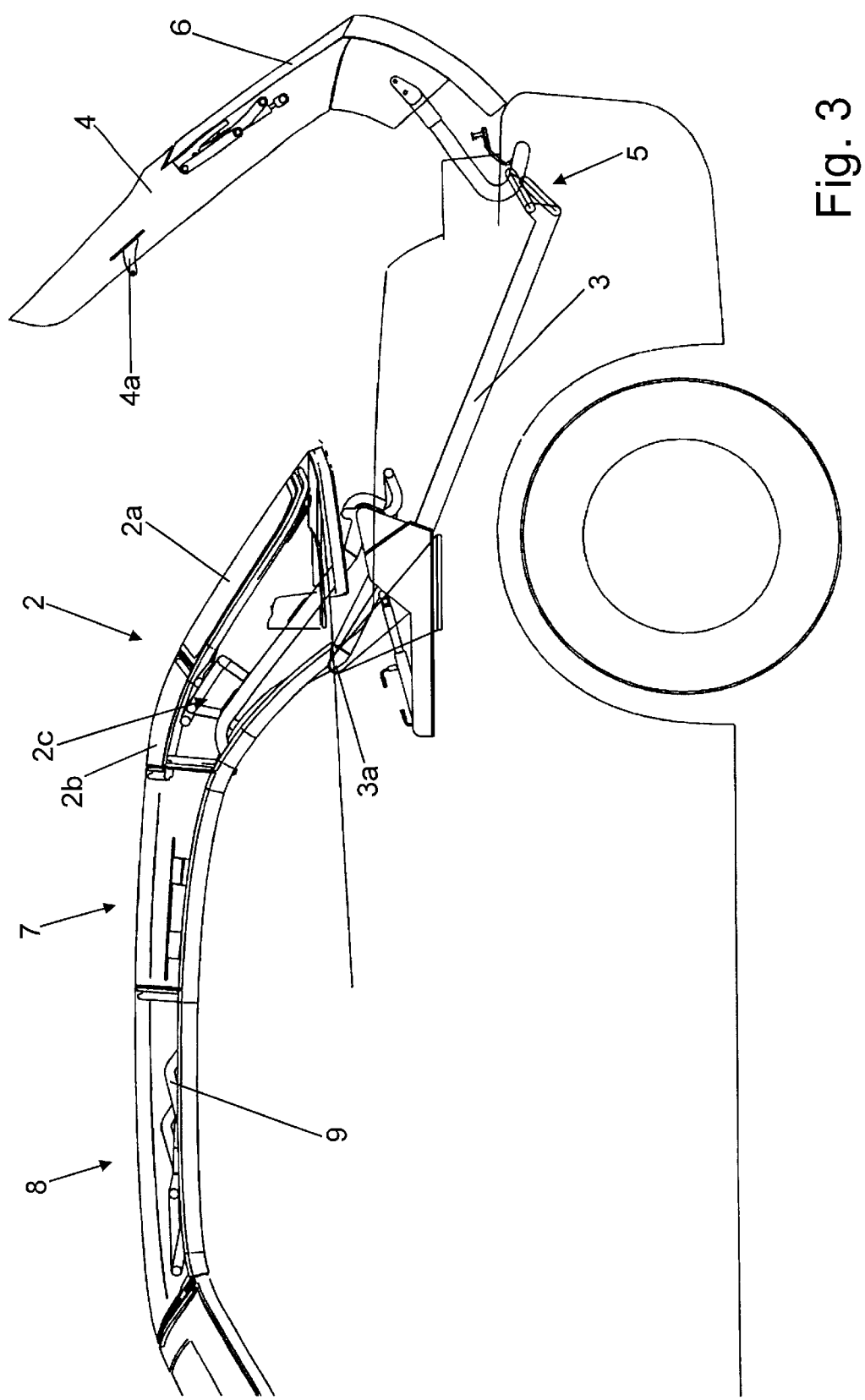
FIG. 3 shows a top for a convertible vehicle in accordance with FIG. 1 in the closed state with the rear element open.
Figure 4:
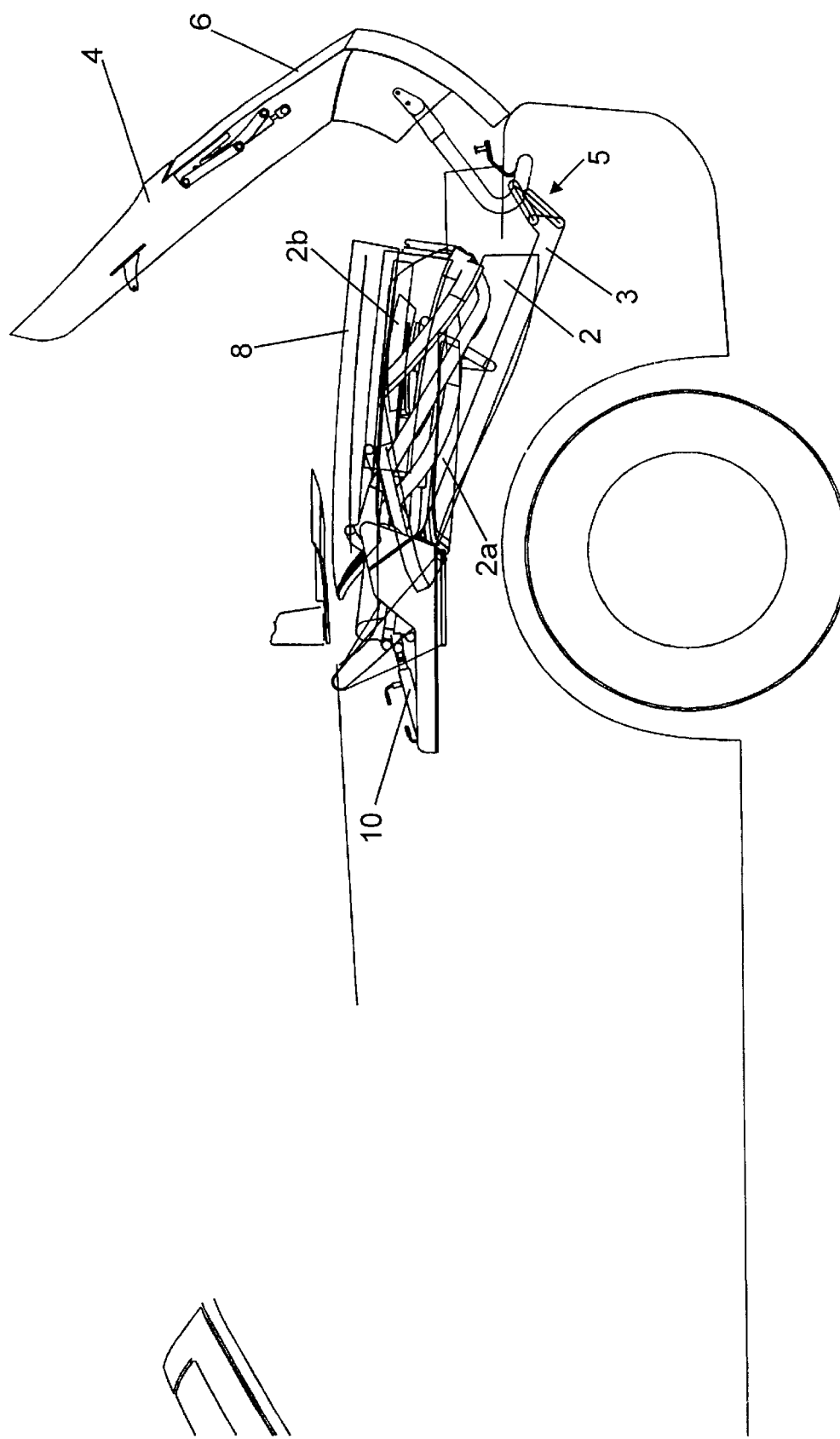
FIG. 4 shows a top for a convertible vehicle in accordance with FIG. 1 in the open state with the rear element open.
Figure 5:
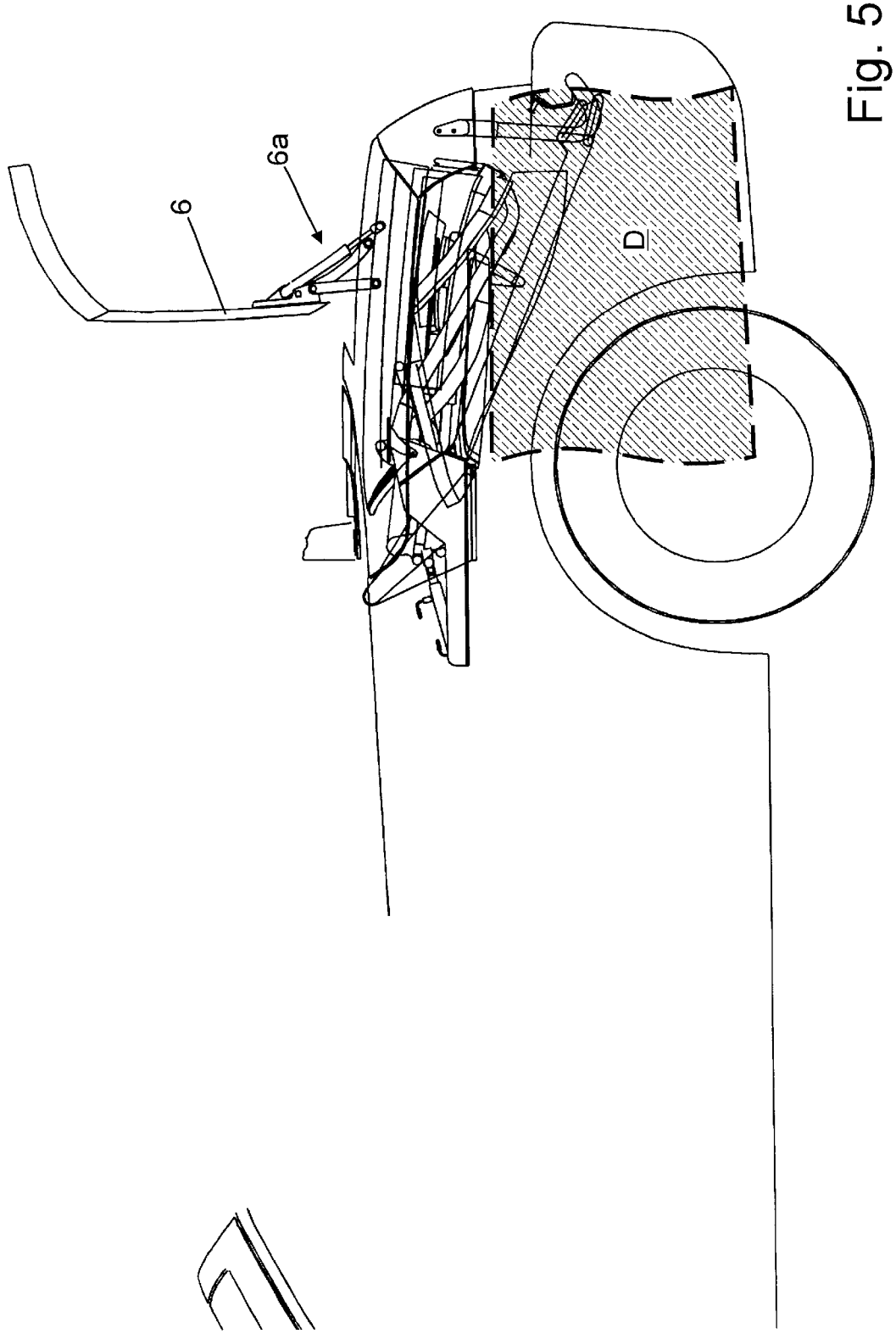
FIG. 5 shows a top for a convertible vehicle in accordance with FIG. 1 in the open state with the loading lid open.
Figure 6:
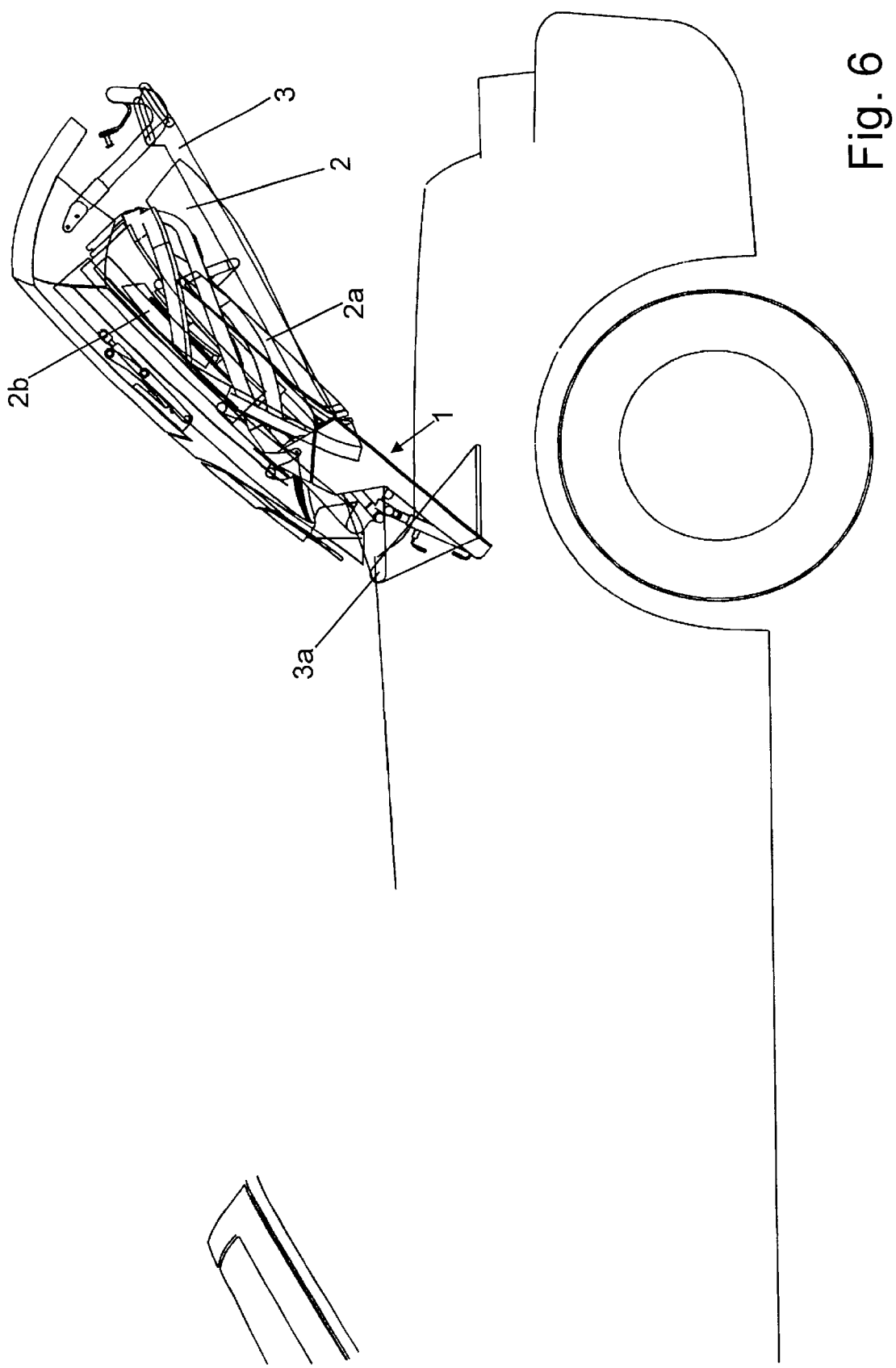
FIG. 6 shows a top for a convertible vehicle in accordance with FIG. 1 in the open state with the frame element pivoted up.
Figure 7:
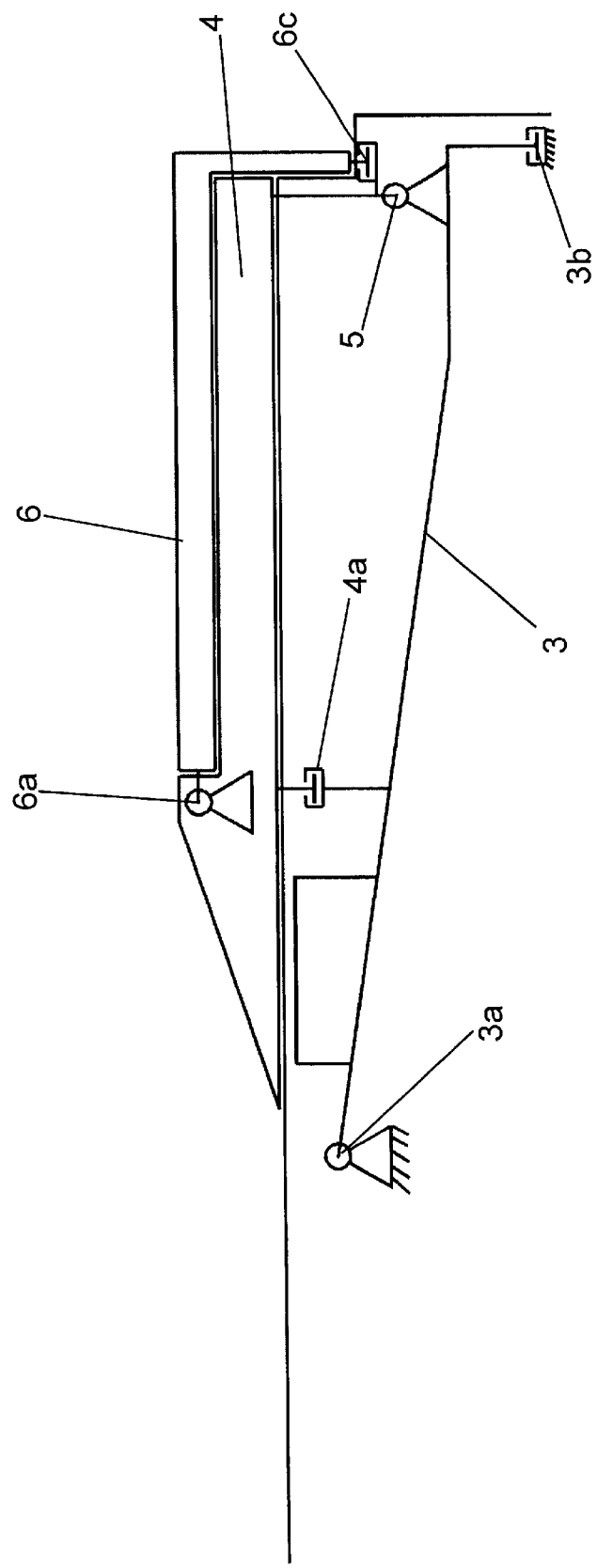
FIG. 7 shows a schematic diagram of the swivel bearings, locks and rigid parts of the loading lid, the rear element and the frame element of a convertible top according to the invention in a respectively closed state.

To deposit the folded-up top in an opening process, the rear element 4 is first of all pivoted up about the rear bearing 5 counter to the direction of travel (see FIG. 3). The multi-part hard-shell folding top is then opened by means of the driving device 12 and moved into a deposited position (see FIG. 4). As can be seen from FIG. 4, the rigid rear window 2a and the roof segment 2b are pivoted away from the roof part 2, with the result that a U-shaped opening in the roof part 2 points towards the rear and bottom of the vehicle, with the result that there is an enlarged through-loading space D (see FIG. 5) underneath the deposited top. Since access to the luggage-space volume is subject to restrictions by the loading lid 6 with the top open and deposited, there is the possibility, as an alternative to loading via the open loading lid 6 (see FIG. 5), to load the available luggage-space volume with bulky objects in an optimum manner as well by pivoting the frame element 3 up about the axis 3a (see FIG. 6), the frame element 3, the rear element 4, the loading lid 6 and the deposited open top simultaneously being pivoted away upwards relative to the vehicle in the direction of travel. For simple implementation of joint pivoting of the frame element 3, the rear element 4, the loading lid 6 and the open deposited top, the main bearing 1, about which the top as a whole can be pivoted, is, in particular, firmly connected to the frame element 3 in the vicinity of the axis 3a.

As can be seen, in particular, from the schematic diagrams in accordance with FIG. 7 to FIG. 10, the pivotable parts, namely the frame element 3, the rear element 4 and the loading lid 6 are secured against pivoting by means of respective locks associated with the pivotable parts, depending on the state of opening of the top and desired loading option. The frame element 3 can be fixed to the body of the vehicle by means of a frame-element lock 3b, the rear element 4 can be fixed to the frame element by means of a rear-element lock 4a, and the loading lid 6 can be fixed to the rear element 4 by means of a loading-lid lock 6c. Automated control of the top by means of a control system (not shown), which is expediently supplied with the states of the top and of the locks 3b, 4a, 6c, is simultaneously provided with a corresponding monitoring facility, by means of which appropriate, e.g. electronic, control or locking of the respective locks 3b, 4a, 6c as a function of the respective state of the top, is provided. It is thus possible, for example, with the top closed, to prevent the frame element 3 from being pivoted up counter to the support of the closed top on the vehicle, which could lead to damage to the top mechanism, or for the rear element 4 to be pivoted during driving, for instance.

What is claimed is:

1. A top for a convertible vehicle, comprising
   a roof part, said roof part at least partially covering the vehicle in a closed state and being pivotable about a main bearing;
   a frame element, said frame element being arranged in a rear area of the vehicle;
   a rear element, said rear element at least partially covering said rear area of the vehicle in a closed state, and
   a loading lid;
   said rear element being fixed on said frame element, in such a way as to be pivotable relative to said frame element, by means of a rear bearing arranged at a distance from said main bearing;
   said frame element being fixed on the vehicle in such a way as to be pivotable relative to the vehicle about an axis arranged in the region of said main bearing;
   said roof part being pivotable relative to the vehicle about said axis together with the frame element in an open, deposited position of said roof part;
   said main bearing being firmly connected to said frame element, and
   said loading lid being fixed on the rear element in such a way as to be pivotable relative to the rear element.

2. Top according to claim 1, wherein the loading lid is fixed on the rear element by means of a four-bar linkage.

3. Top according to claim 1, wherein the loading lid is supported against the rear element by means of a gas spring.

4. Top according to claim 1, wherein the rear bearing comprises a four-bar linkage.

5. Top according to claim 1, wherein the roof part includes a rear roof part, a central roof part and a front roof part, the rear roof part, the central roof part and the front roof part being connected to one another by means of a linkage, said linkage forming a positive control means, a three-part hard-shell folding top thereby being formed overall.

6. Top according to claim 5, wherein the three-part folding top is connected to the main bearing by means of main links, said main links being connected pivotally and at a distance from each other to the main bearing.

7. Top according to claim 6, wherein the main links can be driven by means of a driving device comprising a hydraulic cylinder and a link mechanism.

8. Top according to claim 1, wherein a roof segment is provided, the roof segment being fitted into an aperture in the roof part in a closed position of the top, and the roof segment being pivoted away from the roof part in the open, deposited position of the roof part.

9. Top according to one of claim 1, wherein the roof part comprises a rigid rear window, the rigid rear window being pivoted away from the roof part in the open, deposited position of the roof part.

10. Top according to claim 9, wherein a four-bar rear-window linkage connected to the rear window, on the one hand, and to the roof part, on the other hand, is provided.

11. Top according to claim 10, wherein the four-bar rear-window linkage is connected to a roof segment which can be pivoted with respect to the roof part.

12. Top according to one of claim 1, wherein the frame element is locked against pivoting on the body of the convertible by means of a frame-element lock.

13. Top according to claim 1, wherein the rear element is locked against pivoting on the frame element by means of a rear-element lock.

14. Top according to claim 1, wherein the loading lid is locked against pivoting on the rear element by means of a loading-lid lock.

15. Top according to claim 1, further comprising a monitoring facility to selectively block pivoting of one of the group of frame element, rear element, or loading lid.

* * * * *